(12) United States Patent
Aoki et al.

(10) Patent No.: US 6,504,262 B1
(45) Date of Patent: Jan. 7, 2003

(54) WIRE HARNESS DISTRIBUTION STRUCTURE FOR VEHICLE

(75) Inventors: Tohru Aoki, Shizuoka-ken (JP); Naomi Kisu, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 58 days.

(21) Appl. No.: 09/691,023

(22) Filed: Oct. 19, 2000

(30) Foreign Application Priority Data

Oct. 22, 1999 (JP) .......................................... 11-301202

(51) Int. Cl.[7] ................................................. B60L 1/00
(52) U.S. Cl. ........................ 307/10.1; 307/9.1; 307/10.8
(58) Field of Search ................. 307/9.1, 10.1, 307/10.8

(56) References Cited

U.S. PATENT DOCUMENTS 4,942,571 A * 7/1990 Moller et al. ............... 370/85.1
5,869,907 A * 2/1999 Marler ....................... 307/10.1

FOREIGN PATENT DOCUMENTS

| EP | 0 031 400 | * | 9/1980 | ........... B60R/16/02 |
| EP | 0 470 056 | * | 7/1991 | ........... B60R/16/02 |
| JP | 61-9111 | | 1/1986 | |
| JP | 5-91628 | | 4/1993 | |
| JP | 10/69821 | | 3/1998 | |

* cited by examiner

Primary Examiner—Stephen W. Jackson
Assistant Examiner—Robert L Deberadinis
(74) Attorney, Agent, or Firm—Finnegan, Henderson, Farabow, Garrett, & Dunner, L.L.P.

(57) ABSTRACT

A wire harness distribution structure for a vehicle includes a multi-point junction box (12) provided at one end of a body panel (11) of the vehicle, and two or more electric equipment (21–26) furnished to the other end of the body panel (11). Two or more distribution belts (13A–13F) extend in the radial direction from the multi-point junction box (12) toward the electric equipment (21–26). The multi-point junction box (12) has two or more branch connectors (12a–12e), and each electric equipment has a connector (21a–26a) facing the associated branch connector of the multi-point junction box (12). Each distribution belt (13) comprises a flat cable (14) and female connectors (15) attached to both ends of the flat cable (14), and extends between one of the branch connector (15) and the associated electric equipment at a shortest path.

18 Claims, 5 Drawing Sheets

WIRE HARNESS DISTRIBUTION STRUCTURE FOR VEHICLE

BACKGROUND OF THE INVENTION

1. Field of the Invention

The present invention relates to a wire harness distribution structure used for electrical connection and furnished to, for example, the door panel or the roof panel of an automobile.

2. Description of the Related Art

An example of the conventional wire harness distribution structures for an automobile is illustrated in FIGS. 1 and 2. In this example, the wire harness distribution structure is furnished to the front door of an automobile. In general, a door trim 3, which serves as a cover plate, is attached to the surface 2a of the inner panel 2 of the front door 1 of an automobile.

As shown in FIGS. 1 and 2(a), a multi-point junction box 5 with a circuit branching function is fitted into the recess 2b formed near the door hinge (not shown), that is, at the left end of an inner panel 2 shown in FIG. 1. The junction box 5 is held in the recess 2b by a rubber seal 4. The conventional junction box 5 has a female connector 5a formed in a side face, and a main connector 5b formed at the leading end. The main connector 5b receives a connector (not shown) provided to the car body. A wire harness 6 extends from the trailing end of the multi-point junction box 5. The wire harness 6 branches off toward a power window motor P, a remote control mirror motor R, and a speaker S positioned at the right end, the top left, and the bottom left of the inner panel 2, respectively.

As illustrated in FIGS. 1 and 2(b), a connector 8 is fitted into a recess 3b positioned at the right end of the inner face 3a of the door trim 3. The connector 8 projects from the inner face 3a of the door trim 3 so as to be received by the female connector 5a formed in the side face of the junction box 5 when the door trim 3 is attached to the inner panel 2. The connector 8 is also held by the rubber support 7. Another wire harness 9 extends from the roots of the connector 8 along the inner face of the door trim 3. The wire harness 9 branches off toward a power-window switch PS and a courtesy lamp C positioned at the top and bottom, respectively, of the door trim 3.

To install the wire harnesses 6 and 9 into the front door 1, the wire harness 6 is arranged on the surface 2a of the inner panel 2, and the wire harness 9 is furnished to the inner face 3a of the door trim 3. Assemble of the wire harnesses 6 into the inner panel 2 and assemble of the wire harness 9 into the door trim 3 are carried out independently of each other. Then, the door trim 3, to which the wire harness 9 is furnished, is fixed to the inner panel 2, on which the wire harness 6 is arranged.

A similar technique relating to the door wire harness distribution structure stated above is disclosed in Japanese Patent Application Laid-open No. 61-9111.

However, the conventional door wire harness distribution structure requires two independent steps of providing the wire harnesses 6 and 9 to the surface 2a of the inner panel 2 and to the inner face 3a of the door trim 3, respectively. For this reason, installation and assembling the wire harness takes much labor, and requires skill. In addition, the wire harnesses 6 and 9 themselves must be branched off to be connected to the electric equipment P, R, S, and to PS and C, respectively. This causes the manufacturing cost to increase. Furthermore, the branching configuration of the wire harness must be changed depending on the types of automobiles, which further causes the installation process complicated. Accordingly, an improved wire harness structure common to various types and makes of vehicles has been desired.

SUMMARY OF THE INVENTION

The present invention was conceived in order to overcome these problems in the prior art, and it is an object of the invention to provide an improved wire harness distribution structure which can simplify the assembling process, while reducing the manufacturing cost.

It is another object of the invention to provide a wire harness distribution structure, which can be used in common among various makes and types of vehicles.

To achieve the objects, a wire harness distribution structure for a vehicle includes a multi-point junction box positioned at one end of a body panel of the vehicle, and two or more electric devices furnished to the other end of the body panel. Two or more distribution belts extend in the radial direction from the multi-point junction box toward the electric devices. The multi-point junction box has two or more branch connectors, and each of the electric devices has a connector facing the associated branch connector of the multi-point junction box. Each distribution belt comprises a wire harness and two connectors attached to both ends of the wire harness.

One of the connector of the distribution belt is connected to the connector of the electric device, and the other connector of the distribution belt is connected to one of the branch connectors of the multi-point junction box.

The wire harness distribution structure is furnished simply to the body panel, and does not require a counterpart distribution structure on an inner panel or trim. Accordingly, an overall process for installing of the wire harness distribution structure to the vehicle is simplified. With this arrangement, it is unnecessary to make the wire harness itself branched off at a plurality of points. Each electric device is connected to the multi-point junction box using a corresponding distribution belt at a shortest path. Accordingly, the installation process is further simplified. This distribution belt can be used in common among various makes of cars because the wire harness itself does not have to be branched out.

Preferably, the wire harness is a flat cable made of a plurality of electric wires thermally bonded to each other into a single unit.

The distribution belt can be mass-produced as an auxiliary component for the electric devices. It is unnecessary to change the configuration of the wire harness in accordance with the makes and types of vehicles, which can further reduce the manufacturing cost.

Preferably, an electronic control unit is accommodated in the multi-point junction box, and each branch connector of the junction box is connected to the electronic control unit. This arrangement enables the electric devices to be controlled intensively by a simple operation of the control unit.

BRIEF DESCRIPTION OF THE DRAWINGS

Other objects and advantages will be apparent from the following detailed description of the invention in conjunction with the attached drawings, in which.

DETAILED DESCRIPTION OF THE PREFERRED EMBODIMENTS

Figure 1:
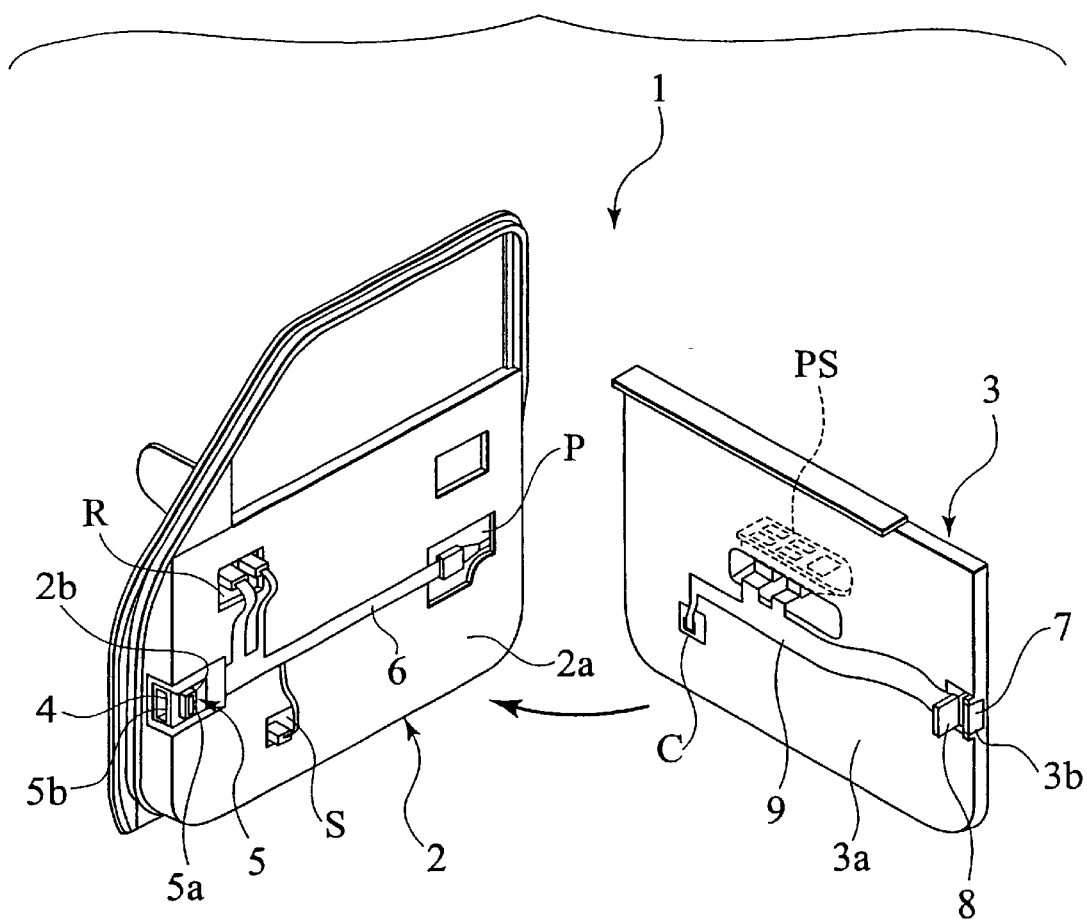
FIG. 1 is an exploded perspective view of a conventional wire harness distribution structure.
Figure 2A:
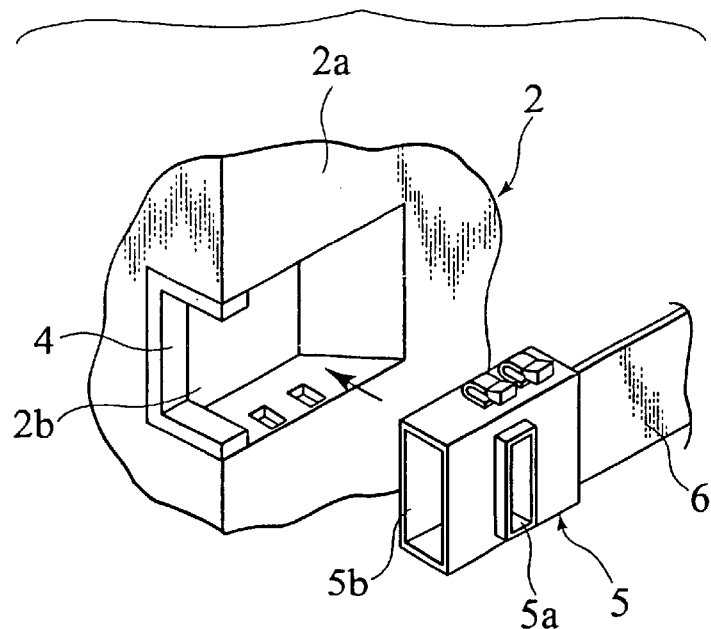
FIG. 2(*a*) is a partially exploded perspective view of a multi-point junction box used in the conventional wire harness distribution structure shown in FIG. 1, and FIG. 2(*b*) is a partially exploded perspective view of a male connector received in the female connector of the multi-point junction box.
Figure 2B:
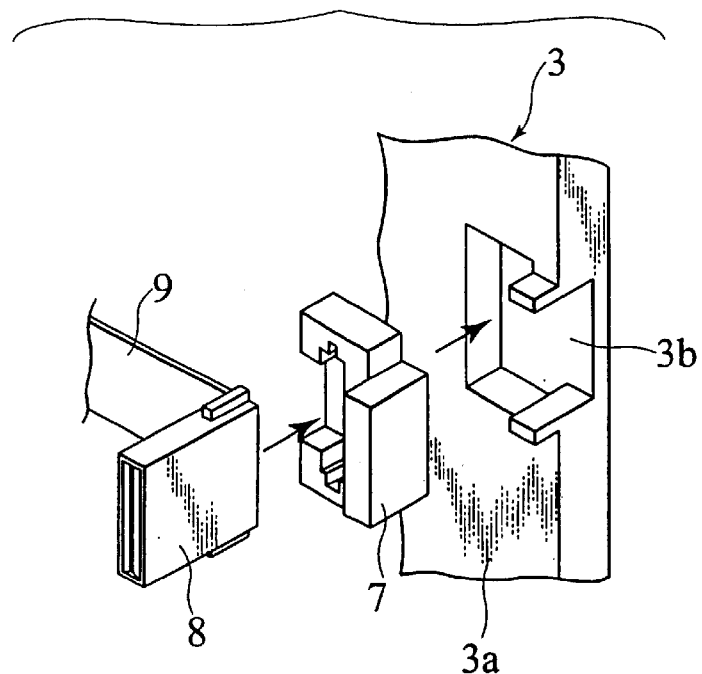
Figure 3:
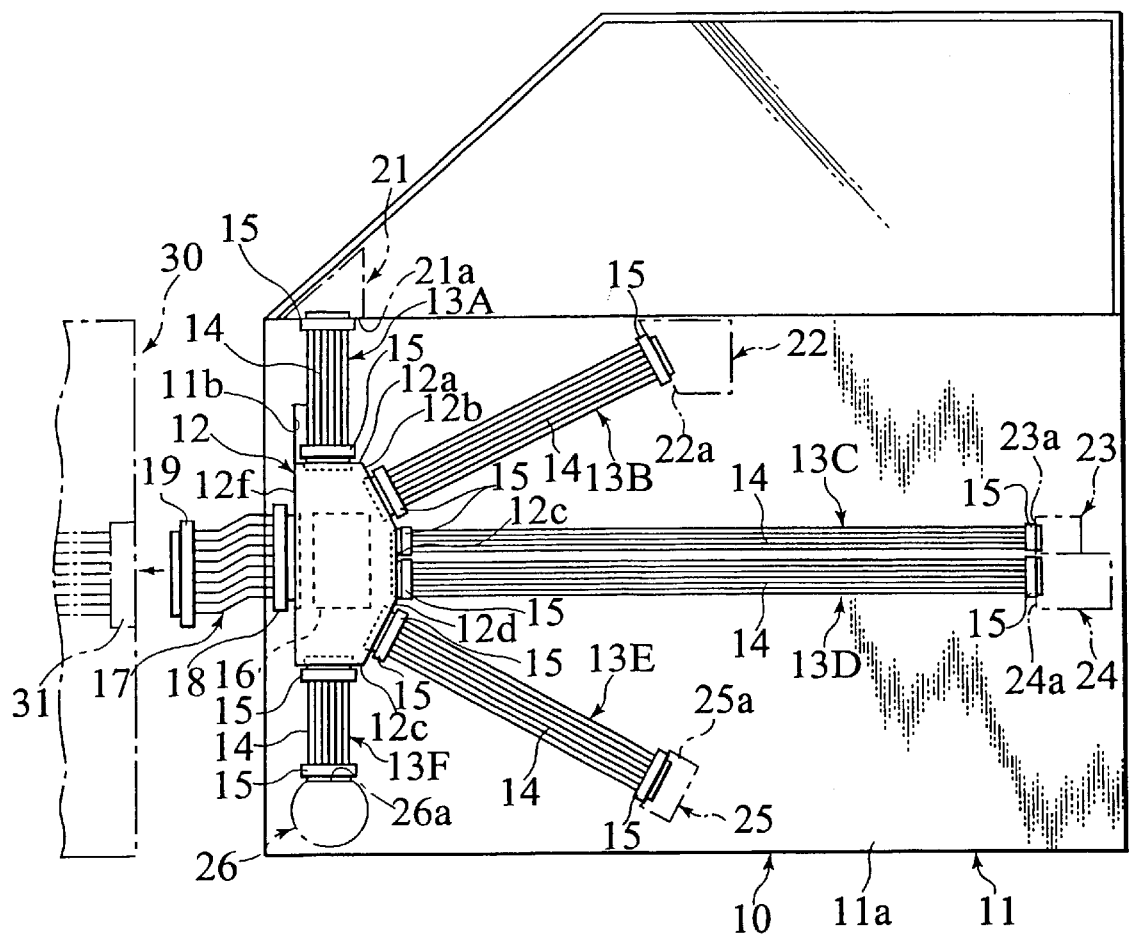
FIG. 3 illustrates a wire harness distribution structure for an automobile door according to an embodiment of the invention.
Figure 4:
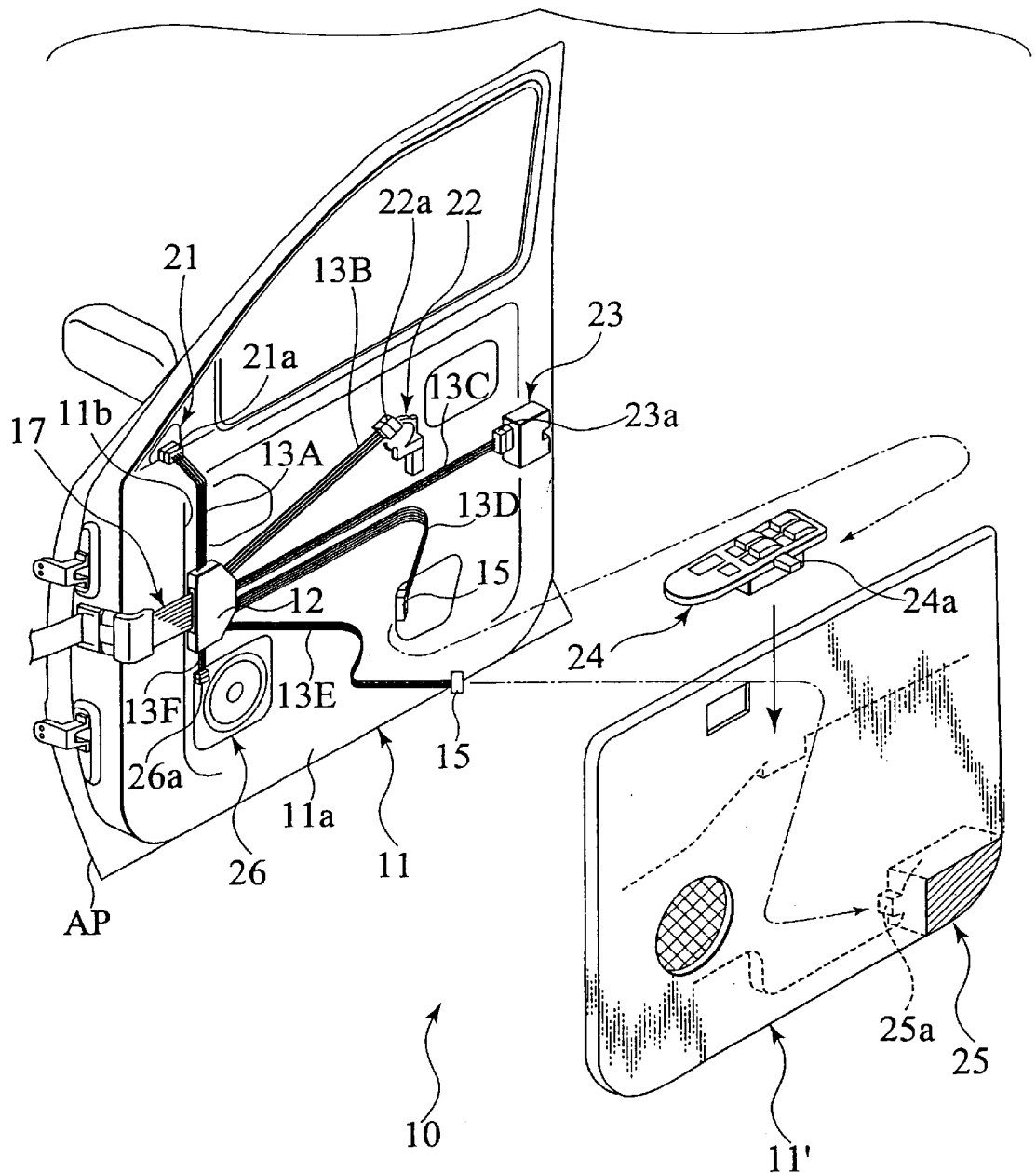
FIG. 4 is an exploded perspective view of the wire harness distribution structure shown in FIG. 3.
Figure 5:
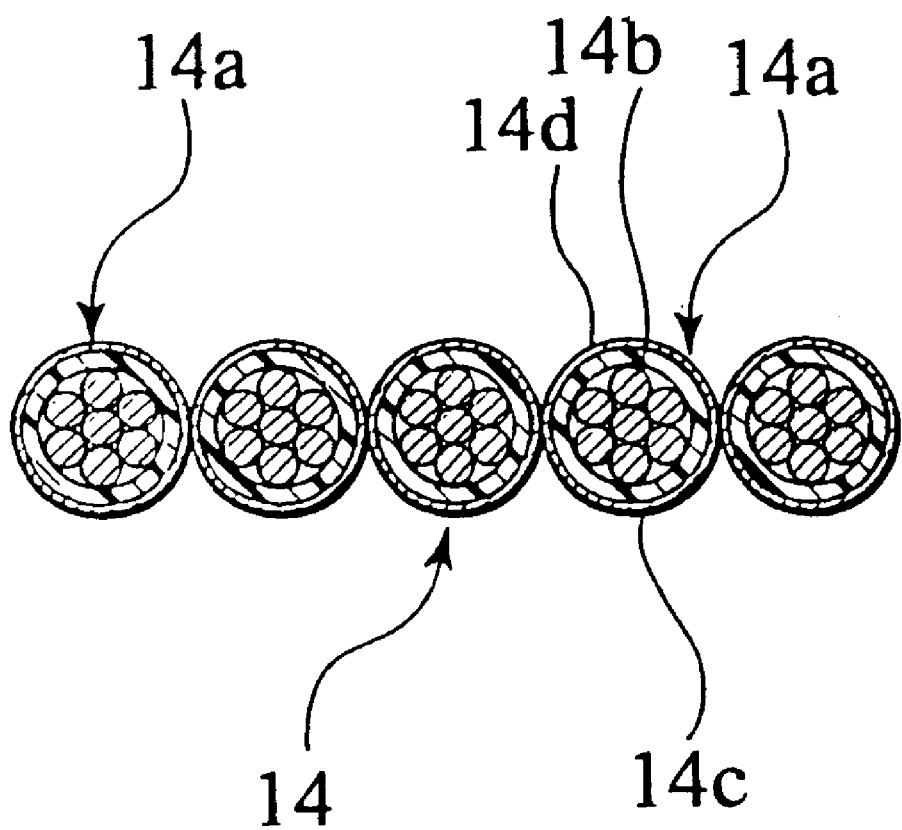
FIG. 5 is a cross-sectional view of a wire harness used in the wire harness distribution structure.

A wire harness distribution structure according to an embodiment of the invention is illustrated in FIGS. 3 through 5. FIG. 3 shows the overall structure of the wire harness distribution structure for a vehicle, and FIG. 4 illustrates how the wire harness distribution structure is installed in the front door of an automobile in an exploded perspective view. FIG. 5 shows the cross-section of a wire harness used in the wire harness distribution structure.

As illustrated in FIG. 4, an automobile front door 10 generally consists of a door panel (or a body panel) DP, an inner panel 11 provided internally, and a door trim 11' attached to the surface 11*a* of the inner panel 11. The inner panel 11 has a hollow 11*b* in the surface 11*a* to accommodate the wire harness distribution structure. A multi-point junction box 12, which has a circuit branching function, is fixed to the left end (i.e., near the door hinge) of the hollow 11*b* using, for example a rubber retainer.

Various electric devices are furnished to the inner panel 11. A remote control mirror motor 21 is positioned at the top left corner of the inner panel 11, and a speaker 26 is positioned at the bottom left. A power window motor 22 and a key motor 23 are also secured to the inner panel 11. On the other hand, a power window switch 24 including key switches, and a courtesy lamp 25 are attached to the door trim 11'.

The electric devices 21 through 26 have male connectors 21*a* through 26*a*. A multi-point junction box 12 is shaped so that monolithically formed male-type branch connectors 12*a* through 12*e* face the associated connectors 21*a* through 26*a* of the electric devices 21 through 26. In this example, the multi-point junction box 12 is shaped in a polygon, and the branch connector 12*c* located in the middle of the junction box 12 is used in common with the electric devices 12 and 24. The uppermost branch connector 12*a* and the lowermost branch connector 12*e* are positioned parallel to each other along the upper and lower edges of the inner panel 11. The branch connector 12*c* is almost perpendicular to the branch connectors 12*a* and 12*e*. The branch connectors 12*b* and 12*d*, which are positioned along the periphery of the polygonal junction box 12 are tilt with respect to the upper and lower branch connectors 12*a*, 12*e* and to the middle connectors 12*c*. This arrangement allows the wire harnesses to extend in the radial direction from the junction box 12 toward the electric devices 21 through 26.

The branch connectors 12*a* through 12*e* of the multi-point junction box 12 are connected to the connectors 21*a* through 26*a* of the associated electric devices 21 through 26 by distribution belts 13A through 13F via the shortest paths. Each of the distribution belts 13A through 13F consists of a flat cable (i.e., a wire harness) 14 and a pair of female connectors 15 attached to both ends of the flat cable 14. The flat cable is made of a plurality of electric wires 14*a* bonded into a single flat unit. The female connector 15 at one end of each flat cable 14 is connected to the one of the branch connectors 12*a* through 12*e* of the multi-point junction box 12. The female connector 15 at the other end of each flat cable 14 is connected to one of the male connectors 21*a* through 26*a* of the electric devices 21 through 26.

The middle branch connector 12*c* positioned at the trailing end of the multi-point junction box 12 is connected to the two female connectors 15 of the distribution belts 13C and 13D. With the door trim 11' attached to the inner panel 11 of the front door, the flat cables 14 of the distribution belts 13D and 13E are gently curved toward the door trim 11', as shown in FIG. 4, so as to allow the female connectors 15 of the distribution belts 13D and 13E to be appropriately connected to the power window switch 24 and the courtesy lamp 25 furnished to the door trim 11'.

FIG. 5 illustrates the vertical cross-section of the flat cable 14 of the distribution belt 13. The flat cable consists of multiple electric wires 14*a* having the same diameter. Each electric wire 14*a* has a core 14*b* and an insulating layer 14*c* formed around the core 14*b*. The insulating layer 14*c* is further coated with a bonding layer 14*d* made of a thermoplastic resin. The electric wires 14*a* are arranged in parallel to each other, and collected into a single flat unit by thermally pressing the entire or a part of the electric wires 14*a* and fusing the bonding layers 14*d* of the adjacent electric wires 14*a*.

An electronic control unit (ECU) 16 is built in the multi-point junction box 12. The electronic control unit 16 is connected to the branch connectors 12*a* through 12*e* of the multi-point junction box 12 via flat cables or the like (not shown). As shown in FIG. 3, the multi-point junction box 12 has a male connector 12*f* at the straight leading end. This male connector 12*f* is received into a female connector 18 attached to one end of a wire harness 17. A connector 19 is provided to the wire harness 17 at the other end, and it is connected to a connector 31 furnished to the automobile body 30.

The branch connectors 12*a* to 12*e* are formed monolithically with the multi-point junction box 12 in such a manner as to face the associated connectors 21*a* through 26*a* of the electric equipment 21 through 26. The branch connectors 12*a* through 12*e* of the multi-point junction box 12 are connected to and disconnected from the associated connectors 21*a* through 26*a* of the electric equipment 21 through 26 using the flat cables 14. Each wire harness (or flat cable 14) is distributed at the shortest path to the desired electric equipment located on the surface 11*a* of the inner panel 11 of the front door 10 or the door trim 11'. Consequently, the assembling process of the front door 10 is greatly simplified.

It is unnecessary to branch out the wire harness itself at a plurality of positions because each electric device is connected to the associated branch connector of the multi-point junction box 12 at the shortest path, using a dedicated distribution belt. The structure of each flat cable 14 is simple, and therefore, troublesome labor for branching out the wire harness according to the make of an automobile can be eliminated. Accordingly, the mass-production can be realized, and the overall cost for manufacturing the front door is further reduced.

The significant feature of the invention is to connect each electric device to the junction box using a disconnectable distribution belt 13. The distribution belt has a simple structure, comprising a flat cable 14 and two female connectors attached to its both ends. The flat cable consists of a plurality of electric wires connected in parallel and thermally bonded each other into a single unit. The distribution belt can be used in common with various makes of vehicles because no matter where electric devices are located, they are appropriately connected to the junction box at a shortest path. This arrangement does not require a process for changing the design of the wire harness depending on vehicles.

Another significant feature of the invention is that the multi-point junction box has a built-in electronic control unit, which is connected to the branch connector of the multi-point connection box 12. This arrangement allows the electric devices to be controlled intensively, while controlling each electric device independently.

Distribution of wire harnesses in the inner panel and toward the door trim can be carried out easily at the shortest paths, without branching out or bending the wire harness. Accordingly, the freedom for selecting materials of the wire harness increases. In addition, the multi-point junction box and the distribution belts can be shipped and used separately, and they can be adapted to various types of vehicles differing in grades and design. Since the basic structures of the signal circuits are almost the same among electric equipment even in different makes and types of vehicles, the distribution belts are adapted broadly merely by slightly changing the number of electric wires used in the flat cable. For example, the distribution belts 13A and 13B connected to the remote control mirror motor 21 and the power window motor 22, respectively, can be designed as a five-circuit cable, two for driving the motor and three for signal supply. In this case, the flat cable consists of five electric wires 14 collected into a single unit by, for example, thermal bonding.

It should be noted that, besides those already mentioned above, many modifications and variations may be made without departing from the novel and advantageous features of the present invention. Such modifications are also included in the scope of the invention defined by the appended claims.

For example, in the preferred embodiment, the wire harness distribution structure is applied to the door panel of an automobile. However, the wire harness distribution structure is not limited to this application, and it can be used in a roof panel or any other panels used for electrical connection.

In the preferred embodiment, the branch connectors of the junction box and the connector of each electric device are male connector, and the distribution belt has female connectors at both ends. However, the distribution belt may have male connector at both ends, and the branch connectors and electric device connectors may be female connectors.

What is claimed is:

1. A wire harness distribution structure for a vehicle, comprising:
    a body panel of the vehicle;
    a multi-point junction box provided at one end of the body panel of the vehicle, the multi-point junction box comprising two or more branch connectors;
    two or more electric devices furnished to, and remote from, the one end of the body panel, each of the electric devices having a connector facing an associated branch connector of the multi-point junction box; and
    two or more distribution belts, each of the distribution belts extending between the connector of one of the electric devices and the associated branch connector, forming a shortest path therebetween.

2. The wire harness distribution structure of claim 1, wherein the distribution belts extend in a substantially radial manner from the multi-point junction box toward the electric devices.

3. The wire harness distribution structure of claim 1, wherein each distribution belt comprises a wire harness and a connector attached to each end of the wire harness.

4. The wire harness distribution structure of claim 3, wherein one of the connectors of each distribution belt is connected to one of the branch connectors of the multi-point junction box and the other connector of each distribution belt is connected to the connector of an associated electric device.

5. The wire harness distribution structure of claim 3, wherein the branch connectors of the multi-point junction box and the connectors of the electric devices are male connectors and the connectors of each distribution belt are female connectors.

6. The wire harness distribution structure of claim 3, wherein the wire harness is a flat cable comprising a plurality of electric wires connected in parallel and collected into a single unit by thermal bonding.

7. The wire harness distribution structure of claim 1, wherein the multi-point junction box includes a built-in electronic control unit connected to the branch connectors of the multi-point junction box.

8. The wire harness distribution structure of claim 7, wherein each of the electric devices are independently and intensively controlled by the electronic control unit.

9. The wire harness distribution structure of claim 1, wherein the multi-point junction box has a polygonal shape and the branch connectors are positioned along the periphery of the polygonal shape.

10. A wire harness distribution structure for a vehicle, comprising:
    a body panel of the vehicle;
    a multi-point junction box provided at one end of the body panel of the vehicle, the multi-point junction box comprising two or more branch connectors and an electronic control unit;
    two or more electric devices furnished to, and remote from, the one end of the body panel, each of the electric devices having a connector facing an associated branch connector of the multi-point junction box; and
    two or more distribution belts, each of the distribution belts extending between the connector of one of the electric devices and the associated branch connector, forming a shortest path therebetween.

11. The wire harness distribution structure of claim 10, wherein the distribution belts extend in a substantially radial manner from the multi-point junction box toward the electric devices.

12. The wire harness distribution structure of claim 10, wherein each distribution belt comprises a wire harness and a connector attached to each end of the wire harness.

13. The wire harness distribution structure of claim 12, wherein one of the connectors of each distribution belt is connected to one of the branch connectors of the multi-point junction box and the other connector of each distribution belt is connected to the connector of an associated electric device.

14. The wire harness distribution structure of claim 12, wherein the branch connectors of the multi-point junction box and the connectors of the electric devices are male connectors and the connectors of each distribution belt are female connectors.

15. The wire harness distribution structure of claim 12, wherein the wire harness is a flat cable comprising a plurality of electric wires connected in parallel and collected into a single unit by thermal bonding.

16. The wire harness distribution structure of claim 10, wherein the electronic control unit is connected to the branch connectors of the multi-point junction box.

17. The wire harness distribution structure of claim 16, wherein each of the electric devices are independently and intensively controlled by the electronic control unit.

18. The wire harness distribution structure of claim 10, wherein the multi-point junction box has a polygonal shape and the branch connectors are positioned along the periphery of the polygonal shape.

* * * * *